United States Patent
Rouvala

(10) Patent No.: US 9,444,918 B2
(45) Date of Patent: Sep. 13, 2016

(54) METHOD AND APPARATUS FOR PROVIDING ACCESS TO A COMPONENT

(71) Applicant: Nokia Corporation, Espoo (FI)

(72) Inventor: Markku Rouvala, Helsinki (FI)

(73) Assignee: NOKIA CORPORATION, Espoo (FI)

( * ) Notice: Subject to any disclaimer, the term of this patent is extended or adjusted under 35 U.S.C. 154(b) by 0 days.

(21) Appl. No.: 13/761,356

(22) Filed: Feb. 7, 2013

(65) Prior Publication Data

US 2014/0217873 A1 Aug. 7, 2014

(51) Int. Cl.
*H04M 1/00* (2006.01)
*H04M 1/02* (2006.01)
*A47B 95/02* (2006.01)
*H04M 1/18* (2006.01)

(52) U.S. Cl.
CPC .......... *H04M 1/0237* (2013.01); *H04M 1/0274* (2013.01); *H04M 1/0202* (2013.01); *H04M 1/18* (2013.01)

(58) Field of Classification Search
CPC ........... H04M 1/0202; H04M 1/0237; H04M 1/0274; H04M 1/18
USPC ...................................... 455/575.8
See application file for complete search history.

(56) References Cited

U.S. PATENT DOCUMENTS

| | | | |
|---|---|---|---|
| 4,317,628 A * | 3/1982 | Shimizu | .......... 396/535 |
| 5,769,159 A | 6/1998 | Yun | |
| 5,773,755 A | 6/1998 | Iwatare | |
| 6,096,969 A | 8/2000 | Fujita et al. | |
| 7,833,649 B2 | 11/2010 | Jones et al. | |
| 2004/0080394 A1* | 4/2004 | Nelson | ............ 338/28 |
| 2006/0186706 A1* | 8/2006 | Browne | ....... B60K 37/06 296/203.01 |
| 2008/0194120 A1 | 8/2008 | Vatanparast et al. | |
| 2008/0205004 A1 | 8/2008 | Ueno | |
| 2009/0080153 A1* | 3/2009 | Richardson et al. | ..... 361/679.56 |
| 2011/0125063 A1* | 5/2011 | Shalon et al. | ............. 600/590 |
| 2012/0050860 A1* | 3/2012 | Sakatani | .......... 359/507 |
| 2012/0219405 A1 | 8/2012 | Szwedowicz et al. | |
| 2012/0275025 A1* | 11/2012 | Parrill | ............. 359/511 |
| 2013/0242150 A1* | 9/2013 | Wittenberg et al. | ......... 348/294 |
| 2013/0271902 A1* | 10/2013 | Lai et al. | ............ 361/679.01 |
| 2014/0157768 A1 | 6/2014 | Jardine | |

FOREIGN PATENT DOCUMENTS

| | | |
|---|---|---|
| JP | 2008245143 | 10/2008 |
| KR | 200398924 | 10/2005 |
| WO | WO2010/087585 | 8/2010 |

OTHER PUBLICATIONS

Sekitani et al., "Stretchable, Large-area Organic Electronics", Adv. Mater. 22, 2010, pp. 2228-2246.

(Continued)

Primary Examiner — Timothy Pham
(74) Attorney, Agent, or Firm — Hollingsworth Davis, LLC

(57) ABSTRACT

An apparatus comprising an enclosure and a cover comprising a shape-memory alloy is provided. The enclosure has at least one void that facilitates access to a component of the apparatus. The cover has at least an opened shape and closed shape, wherein the cover allows access to the component via the void in the opened shape and covers at least part of the void in the closed shape, wherein the cover transitions from the closed shape to the opened shape in response to the apparatus being accessed.

18 Claims, 9 Drawing Sheets

(56) References Cited

OTHER PUBLICATIONS

Wei et al., "Shape-memory materials and hybrid composites for smart systems", Journal of Materials Science, 33, 1998, pp. 3743-3762.
Thrystan, "Kyocera EOS is an OLED Phone Concept, Context-Sensitive Display Also Showed Off", www.concept-phones.com/news/kyocera-eos-oled-phone-concept-contextsensitive-display-showed/, Apr. 17, 2009, (6 pages).
Thrystan, "Morphy Pliable Mobile Phone Changes Shape Using Body Heat", www concept-phones.com/cool-concepts/morphy-pliable-mobile-phone-shape-body-heat/, Apr. 17, 2011, (5 pages).
Office Action dated Dec. 17, 2015 from European Application No. 13195801.9, 5 pages.
Office Action dated Mar. 22, 2016 from Chinese Application No. 201410031029.6, 7 pages.

\* cited by examiner

METHOD AND APPARATUS FOR PROVIDING ACCESS TO A COMPONENT

TECHNICAL FIELD

The present specification relates to mobile device enclosures, and more specifically, to providing access to a component of the mobile device through a void in the enclosure.

BACKGROUND

Mobile devices, such as cellular phones, protect their internal components/circuitry with an exterior housing. Openings and voids in that housing provide pathways for environmental hazards such as water, humidity, dust, small particles, and electrostatic discharge to breach the protective housing and damage the internal components/circuitry.

A variety of openings are provided in the exterior housings of mobile devices. These openings facilitate components of mobile devices such as keyboards, cameras, optical interfaces, displays, speakers, and microphones. In addition, openings may provide access to internal components for accessory devices such as audio/video input/outputs and power supplies. The openings in the housing may be of a variety of shapes and sizes as necessitated by the internal components requiring exterior access and the accessory devices requiring internal access. Due to the potential for damage by intrusive forces, the number and sizes of openings are preferably limited. These openings may be always open or temporarily covered with an external, manually removable seal. However, protection for such openings would provide further security for the internal components/circuitry of mobile devices.

SUMMARY

The present specification discloses apparatus and methods for obtaining access to a component of a device.

One embodiment is directed to an apparatus comprising an enclosure and a cover comprising a shape-memory alloy. The enclosure has at least one void that facilitates access to a component of the apparatus. The cover has at least an opened shape and a closed shape, wherein the cover allows access to the component via the void in the opened shape and covers at least part of the void in the closed shape. The cover transitions from the closed shape to the opened shape in response to the apparatus being accessed.

In another embodiment an apparatus comprises an enclosure and a cover comprising a shape-memory alloy. The enclosure has at least one void that facilitates access to an internal component of the apparatus. The cover has at least an opened shape and a closed shape, wherein the cover allows access to the internal component via the void in the opened shape configuration and covers at least part of the void in the closed shape. The cover transitions from the opened shape to the closed shape in response to a sensed context of the apparatus.

Another embodiment is directed to a method. The method includes determining a context of an apparatus. The context determines at least one of a) whether an internal component of the apparatus may experience detrimental effects from being exposed via at least one void of an enclosure of the apparatus, the void facilitating access to the internal component; and b) whether access to the internal component via the void is requested. In response to determining the context, the method further includes causing a signal to be sent to a cover comprising a shape-memory alloy having at least an opened shape and closed shape, wherein the cover allows access to the internal component via the void in the opened shape configuration and covers at least part of the void in the closed shape. The cover transitions between the opened shape and the closed shape in response to the signal.

The above summary is not intended to describe each disclosed embodiment or every implementation. For a better understanding of variations and advantages, reference should be made to the drawings which form a further part hereof, and to accompanying descriptive matter, which illustrate and describe representative embodiments.

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the invention.

The present disclosure is generally related to methods and apparatuses for protecting internal components/circuitry of a mobile device that may be exposed to external elements via openings in the device housing. Protection is provided by a cover element made of a shape-memory alloy (SMA). SMAs are alloys that retain differing shapes in response to an applied energy. For example, the material acquires a first shape in a default state and transitions to a second shape in response to an applied energy. The material "remembers" the two different shapes and can return to the first shape when the material again experiences the original conditions. The differing shapes are "learned" by the material through training.

The energy applied to change the shape of, or activate, a SMA may be heat or force. For example, a SMA may attain differing shapes dependent upon the temperature of the SMA—having a first shape at lower temperatures and a second shape at higher temperatures. A material that shows a shape memory effect during both heating and cooling is called two-way shape memory. Examples of SMA materials include TiNi system alloys, copper-based alloys, iron-base alloys, and intermetallic compounds. SMAs are suitable for actuation applications since they can operate without friction and without spreading dust particles or producing noise.

Figure 1:
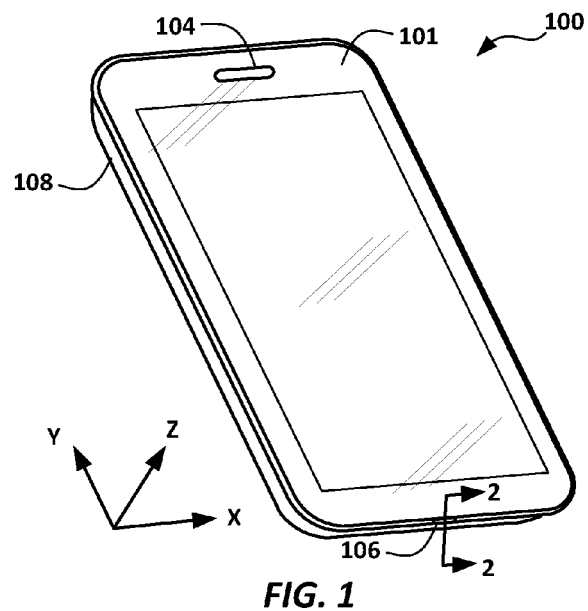
FIG. 1 is a perspective view of a mobile apparatus using a shape-memory alloy element according to an example embodiment.

With reference to FIG. 1, a mobile device 100 is illustrated. Mobile device 100 may be a cellular telephone, music player, personal digital assistant, or other handheld apparatus. The device includes a screen 101, which may be a touch screen, and an exterior housing 108. The housing 108 encloses the internal circuitry and components of mobile device 100 and includes at least two openings, speaker 104 and void 106. Speaker 104 includes an opening in housing 108 to facilitate user access to audio generated by internal speaker 104. Void 106 is an opening in housing 108 that provides external access to internal components of mobile device 100. Void 106 is protected with an SMA element according to example embodiments and is further illustrated in FIG. 2.

Figure 2:
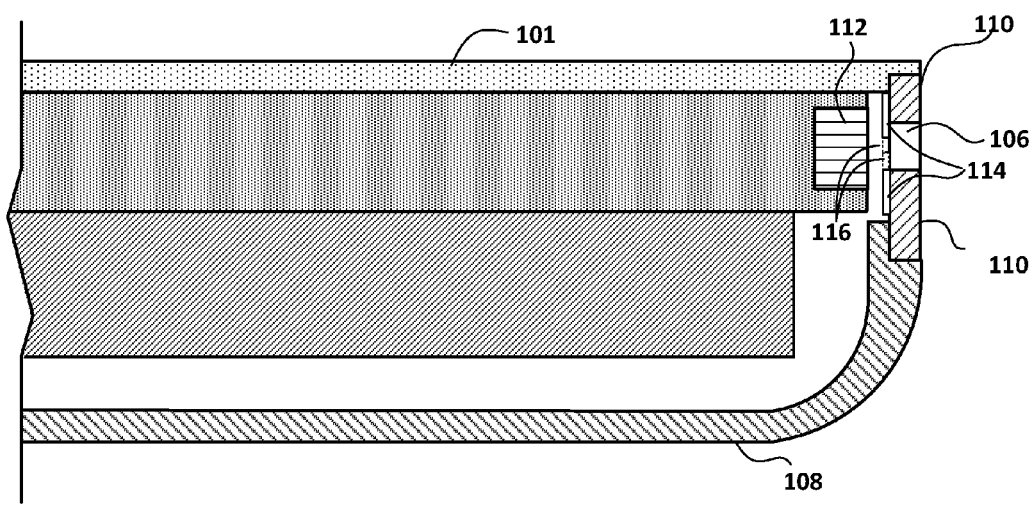
FIG. 2 is a cross sectional view of the apparatus of FIG. 1 corresponding to cross section 2-2.

FIG. 2 illustrates a cross-section of the mobile device 100 of FIG. 1 at section 2-2. The screen 101 is shown attached to the housing 108 via a housing plate 110. However, the screen 101 and housing 108 may be coupled using a variety of techniques, fasteners, and housings. Plate 110 includes void 106, which provides access to internal component 112. However, internal component 112 is protected by cover 114. While cover 114 is shown located within the housing 108, cover 114 could also be located exterior to the housing 108. Cover 114 is attached to plate 110 and is made of a shape-memory alloy (SMA). Cover 114 may assume an open shape and a closed shape. In FIG. 2, cover 114 is shown in the open shape, and the closed shape 116 is illustrated by dashed lines.

Cover 114 may involve one or more parts. In the embodiment of FIG. 2, cover 114 has two parts, one on each side of void 106. While cover 114 has two parts, cover 114 could comprise a single SMA component with a gap or slit therein or comprise two SMA components meeting or overlapping in a closed shape. The closed shape 116 can be a hermetic seal rendering the housing 108 temporarily water and humidity tight. For example, very fast acting humidity sensors, such as graphene sensors, can actuate cover 114 to attain a closed, sealed shape when mobile device 100 is exposed to water such as rain or through being partly or fully submerged.

In addition to water, cover 114 may protect against electrostatic discharge (ESD). If an internal component of mobile device detects ESD, cover 114 can be actuated to attain a closed shape to block additional fast electronic transients. While they do not involve physical openings in enclosure 108, optical openings, such as infrared or ambient light sensors, covered by a lens or glass can also be protected from ESD by closing cover 114 behind the lens or glass. This temporary tightening of cover 114 may also be used to protect a keyboard. A keyboard surrounding SMA cover layer can attain closed shapes that temporarily lock the buttons in an outward position while the cover layer seals the underlying components from ESD. Different configurations of a cover 114 are discussed below.

FIGS. 3-6 show example positions and shapes a SMA cover may have. For example, a cover may have an open shape or a closed shape. An open shape is where the cover is retracted or positioned so as to expose part or all of an internal component to a void in a device enclosure. In contrast, in a closed shape a cover is extended to block exposure of an internal component to a void in the device enclosure. While two shapes, open and closed, are discussed herein with respect to SMAs having two shape memories, intermediate shapes (partially open/closed) are also contemplated when using a SMA having more than two shape memories.

Figure 3:
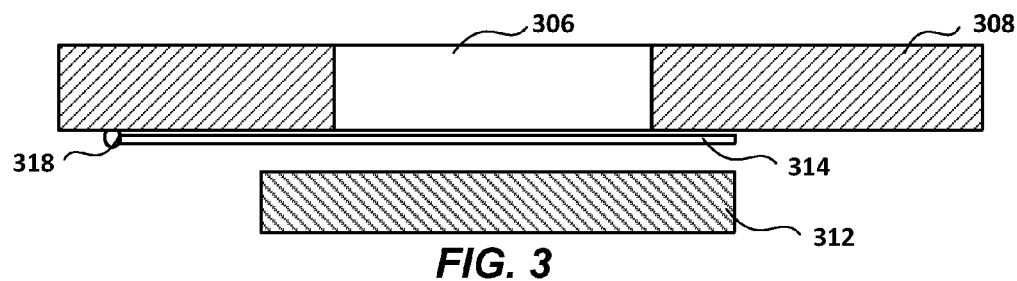
FIGS. 3-6 are cross sectional views illustrating configurations of a shape-memory alloy cover according to example embodiments.

In one example embodiment, FIG. 3 illustrates cover 314 in a closed shape. The cover 314 is positioned parallel to void 306 and extends beyond the edges of void 306 to block internal component 312 from exposure to void 306. While cover 314 is attached to the interior of enclosure 308 at attachment point 318 on the left side of void 306, attachment point 318 could be located at any point on the interior of enclosure 308 such that cover 314 extends in a closed position to block at least some of the opening of void 306. For example, attachment point 318 could be positioned to the right of void 306 and/or cover 314 could extend partially across void 306.

Figure 4:
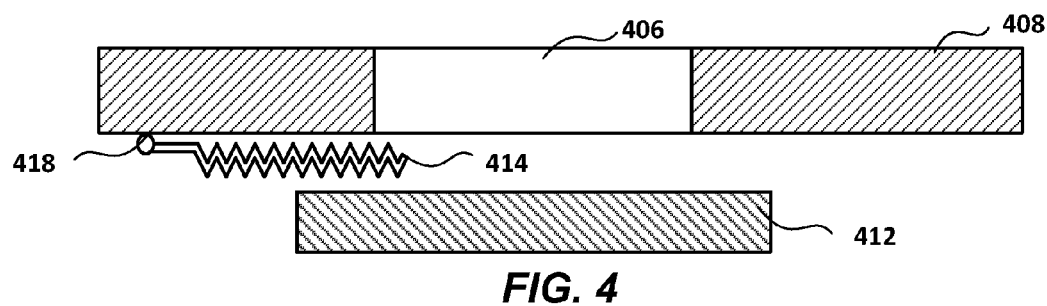
Figure 5:
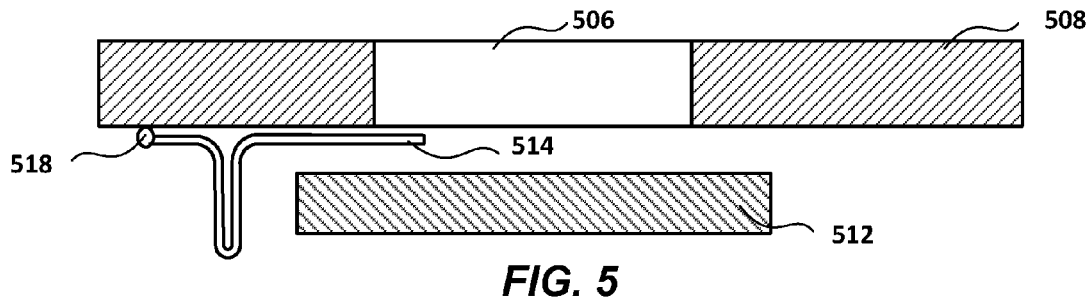
Figure 6:
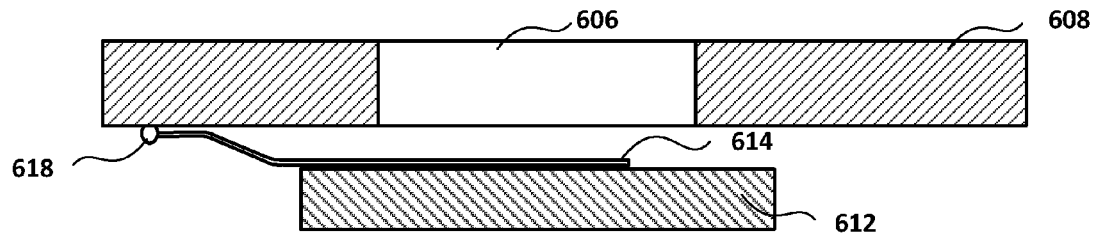

While FIG. 3 illustrates a closed shape of a SMA cover, FIGS. 4-6 illustrate various open shapes. In one example embodiment, FIG. 4 illustrates cover 414 in an open accordion shape where cover 414 has multiple folds. Cover 414 folds toward attachment point 418 to expose internal component 412 to void 406. The folds of cover 414 extend back and forth between enclosure 408 and internal component 412 in a retracted position, e.g., like a spring. The lengths of the folds in the open position may be configured so that cover 414 does not contact the interior surface of enclosure 408 or internal component 412, other than at attachment point 418.

In an alternative embodiment, FIG. 5 illustrates cover 514 in an open shape with a single fold. Cover 514 retracts toward attachment point 518 into a cavity adjacent to internal component 512 while a portion of cover 514 may remain parallel to the interior surface of enclosure 508. Cover 514 also exposes internal component 512 to void 506. Cover 514 differs from that of cover 414 in an open position in the amount and location of space occupied by the retracted cover. Also, cover 514 may experience less stress and strain with a single fold in the open position compared with cover 414 having multiple folds in an open position, thereby providing increased durability.

FIG. 6 illustrates another alternative embodiment of an open shape for cover 614. Here, cover 614 retracts toward attachment point 618 by deflecting away from the interior surface of enclosure 608 toward internal component 612. This open position is shown partially exposing internal component 612 to void 606. Since cover 614 does not flex to an angle less than ninety degrees, the amount of exposure to void 606 is determined by the distance between internal component 612, the interior surface of enclosure 608, and the length of cover 614. For example, the deflected open shape of cover 614 could expose internal component 612 to the entirety of void 606. A further example of a closed and open shape of a cover is provided in FIGS. 7-8.

Figure 7:
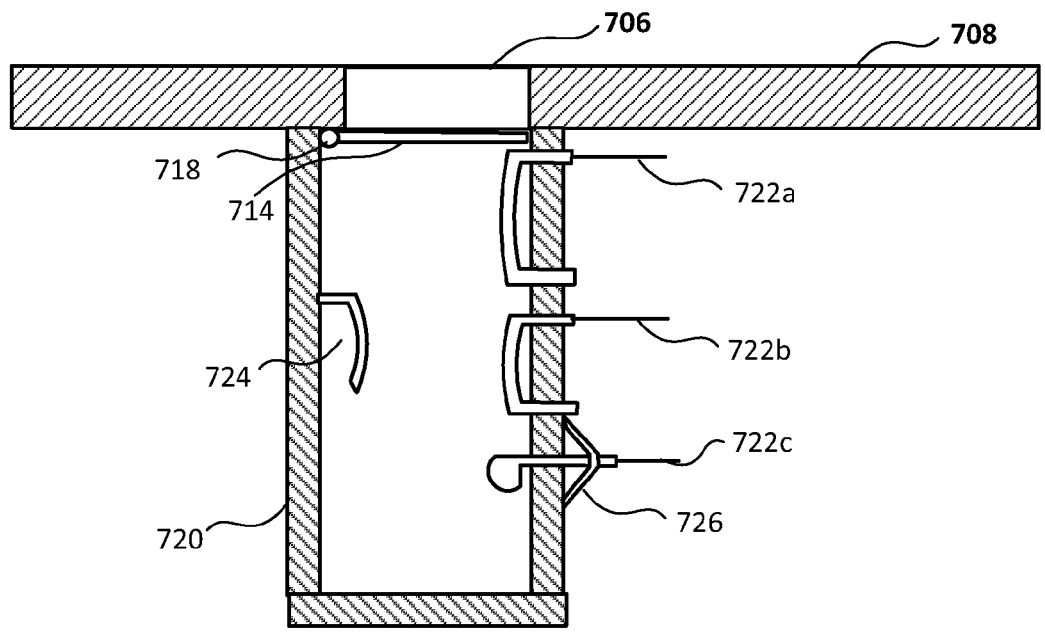
FIGS. 7-8 are cross-sectional views of a connector assembly using a shape-memory alloy cover and tensioner according to an example embodiment.

FIG. 7 illustrates an example embodiment of a receptacle accessed via void 706 in enclosure 708. The receptacle may be configured to receive a connector from an accessory device. The receptacle housing 720 includes components for accessing internal components (e.g., conductors 722a-c), components for securing a connector in the receptacle (e.g., counter-spring 724), and a cover 714. Cover 714 may attach to enclosure 708 and/or receptacle housing 720. As shown, conductors 722a-c may be of a variety of sizes and shapes. For example, conductors 722a and 722b may have the same general shape but be of different sizes/contact surface areas.

Conductor 722c may be internally or externally spring loaded with a tensioner 726 optionally also made of SMA. Since the receptacle of FIG. 7 is vacant, cover 714 is in a closed shape, covering access to the receptacle from void 706. While the closed shape of cover 714 is shown as having a flat surface parallel to void 706, the surface of cover 714 could be uneven or bent in a variety of shapes.

Figure 8:
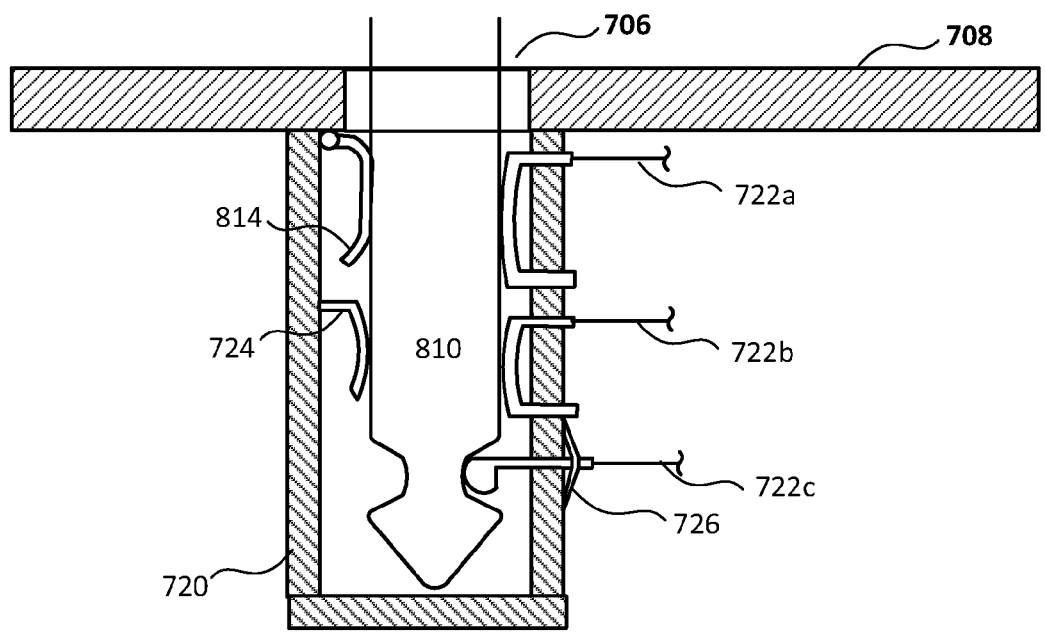

In FIG. 8, the receptacle of FIG. 7 is occupied by connector 810. For example, connector 810 may be a plug connected to headphones through void 706. Connector 810 is secured in the receptacle with counter-spring 724 and conductors 722a-c. Conductors 722a-b position connector 810 in the receptacle by providing contact and an opposing force to counter-spring 724. Conductor 722c provides additional security through contact with an indented portion of connector 810. Spring-loaded conductor 722c is activated by SMA tensioner 726 when connector 810 contacts conductor 722c. In addition, cover 814 attains an open shape when connector 810 occupies the receptacle.

Cover 814 in FIG. 8 is cover 714 with an open shape. The open shape of cover 814 may also aid in securing the position of connector 810, much like counter-spring 724. Cover 814 transitions to the open shape in response to a signal received at attachment point 718, or elsewhere on cover 814. The signal may be provided to attachment point 718 through the receptacle housing 720. Actuation of multiple SMA elements such as cover 814 and tensioner 726 may be controlled separately or together. The transition from closed cover 714 to open cover 814 may be initiated with a variety of signals as discussed further below.

Figure 9:
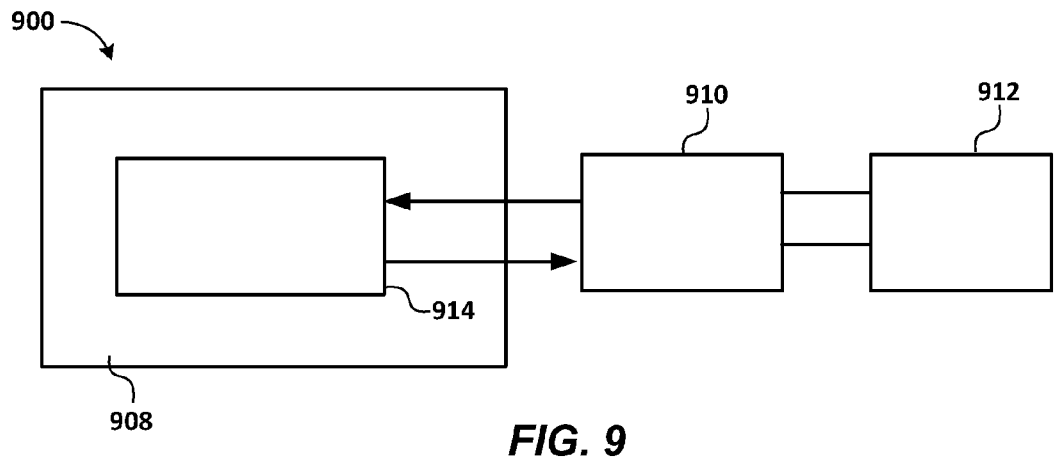
FIGS. 9-11 are block diagrams of shape-memory alloy element sensor and/or control circuitry according to example embodiments.

FIG. 9 illustrates an example embodiment of control circuitry for controlling the transition of cover 914 from a closed to an open shape (or vice versa). Device 900 includes cover 914 within housing 908. Cover 914 is an SMA, as discussed above, that transitions shape in response to an applied current. In the example embodiment, driver 910 receives a signal from host 912 and directly applies a current to cover 914. The host may generate the signal based on a detected context of the device 900. The context may be recognized by an initiation of an application (e.g., software) or a change in the device's hardware such as moving to a use orientation. For example, initiation of a music player application may trigger opening cover 914 to expose a speaker or tightening of connectors as shown in FIG. 8.

In response to the directly-applied current, cover 914 transitions shape (e.g., from a closed shape to an open shape). As feedback, driver 910 senses the resistivity of cover 914 to evaluate whether continued current should be applied. For example, current may continuously be applied to maintain cover 914 in an open shape. The amount of current applied to maintain the open shape may be less than, or equal to, the amount of current applied to initiate the shape transition. The small energy applied as current to cover 914 heats the SMA. When it is determined that cover 914 should change shape again, the current is discontinued to deactivate or return cover 914 to the original shape.

Figure 10:
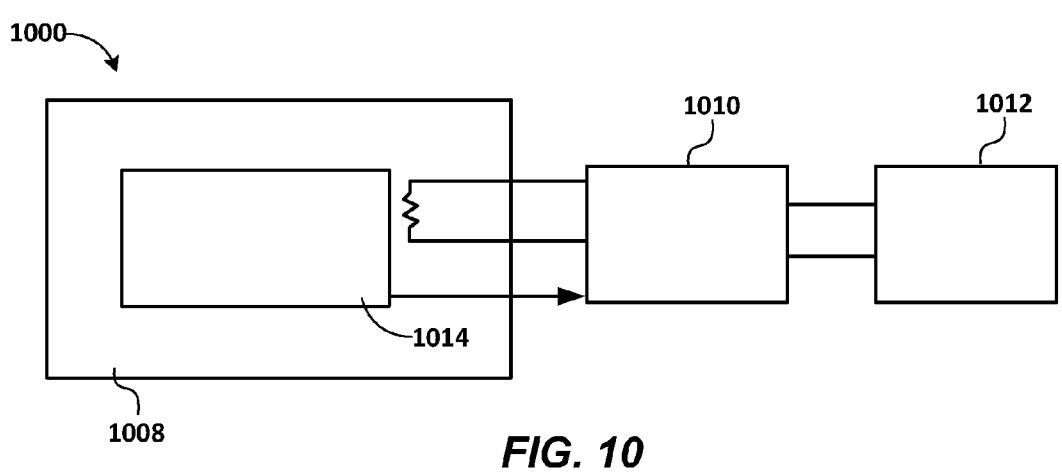

In an alternative embodiment shown in FIG. 10, a cover 1014 transitions shapes in response to applied heat. Similar to the above discussion, host 1012 sends a signal to driver 1010 in response to a change in context, but instead of applying current to cover 1014, heat is applied via a heating element. The heat may be applied directly or in close proximity to cover 1014. The heat is of sufficient magnitude to trigger the shape change but not affect the operational circuitry of device 1000. Opening of cover 1014 exposes a corresponding internal component and also provides a release for the applied heat through enclosure 1008. As discussed above, driver 1010 may receive feedback in the form of a resistivity signal for use in determining when/whether another shape transition is required to return to the original status of cover 1014.

Figure 11:
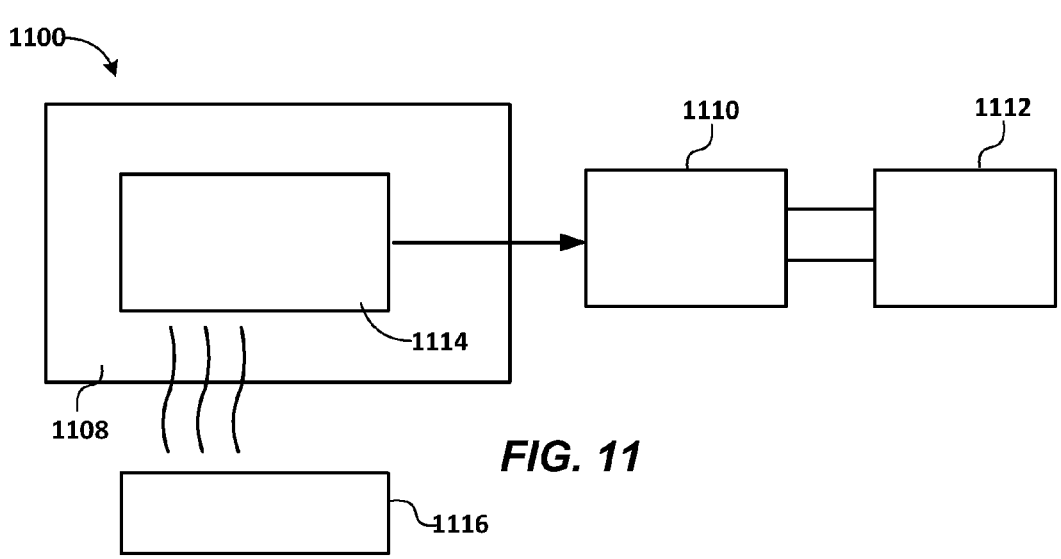

FIG. 11 illustrates another alternative manner of triggering shape transition for cover 1114 through passively sensing a trigger external to (or internal to) device 1100. Device 1100 through one or more sensors in the enclosure 1108, or internal to device 1100, detects triggering context changes. These external triggers initiate a shape transition for cover 1114. Driver 1110 may optionally monitor the shape status of cover 1114 through a resistivity sensor and relays the signal to host 1112.

The external triggers can relate to where and/or how the device 1100 is being used. For example, the heat from a user's hand on a thermal negative temperature coefficient (NTC) resistor located on the surface of enclosure 1108 may indicate that device 1100 is in use such that certain components, such as a microphone, are to be accessed. Other external triggers may involve humidity, water, or gas concentrations recognized by sensors incorporated into device 1100. The external trigger detection may be used alone or in combination with the application-based context detection for initiating shape change in SMA elements. For example, heat detected by a NTC resistor may directly initiate a shape change, heat detected by a NTC resistor may trigger host 1112 to send an initiation signal as discussed above in FIG. 9, or heat detected by a NTC resistor in combination with opening of an application may initiate the shape transition.

Figure 12:
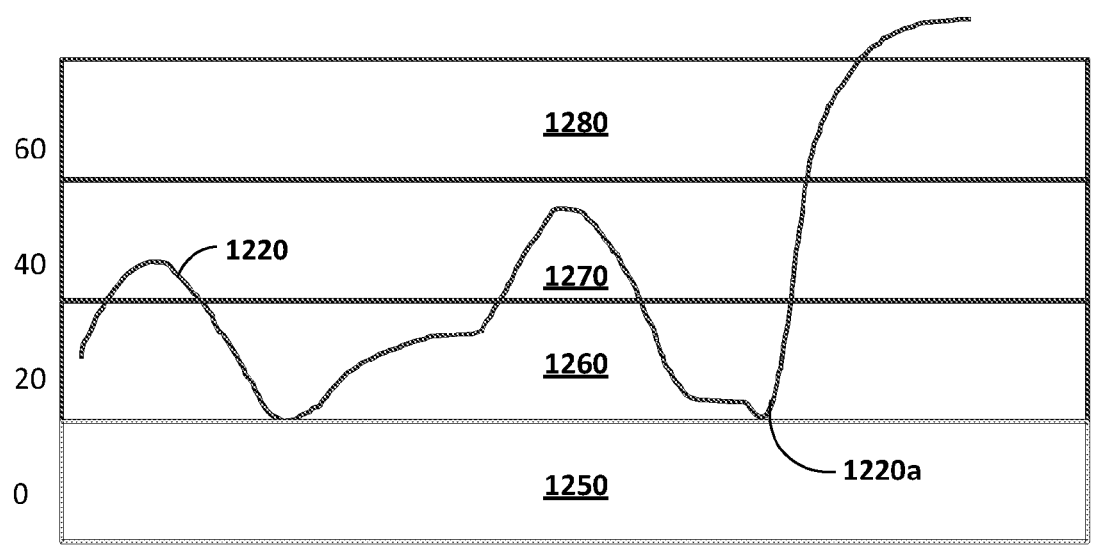
FIG. 12 is a chart illustrating operating temperature regions of an apparatus using a shape-memory alloy element according to example embodiments.

FIG. 12 illustrates example operating temperature regions of an apparatus using a SMA element. A typical mobile apparatus may operate at a variety of temperatures; for example, from −10 through 60 degrees Celsius (C). Region 1250 indicates typical outdoor temperatures, region 1260 represents typical indoor temperatures, and region 1270 represents warm outdoor temperatures. Temperature regions 1250, 1260, and 1270 represent normal apparatus operating temperatures. Region 1280 represents temperatures from about 60 degrees Celsius and above, which would be very hot surfaces for an apparatus to contact. The curve 1220 represents an example temperature profile of an SMA element during use of a mobile apparatus. Without additional energy being applied, the temperature of the SMA element would approximately correspond to the temperature of the mobile apparatus.

Depending on the SMA material used, the SMA element transitions shapes at a predetermined temperature. In the example illustrated in FIG. 12, the predetermined temperature is 50 C. At temperatures below 50 C (regions 1250, 1260, and 1270), the SMA element is configured to retain a default shape, typically the closed shape. However, once the temperature of the SMA element reaches 50 C or higher, the SMA element transitions to the second, typically the open, shape. Portion 1220a of the curve illustrates a time at which the SMA element begins to be heated. As discussed above, this heating could occur through direct application of current or heat, or by the body heat of a user's hand accessing the exterior housing of the mobile apparatus. When the apparatus or SMA element is at, or above, 50 C (region 1280), the SMA element is in the open shape. Thus, maintaining the temperature of the SMA element above 50 C will maintain the SMA element in the open shape. To return to the closed shape, the SMA element is cooled to below 50 C. The operability in such a range of temperatures supports the mobility of the apparatus.

Figure 13:
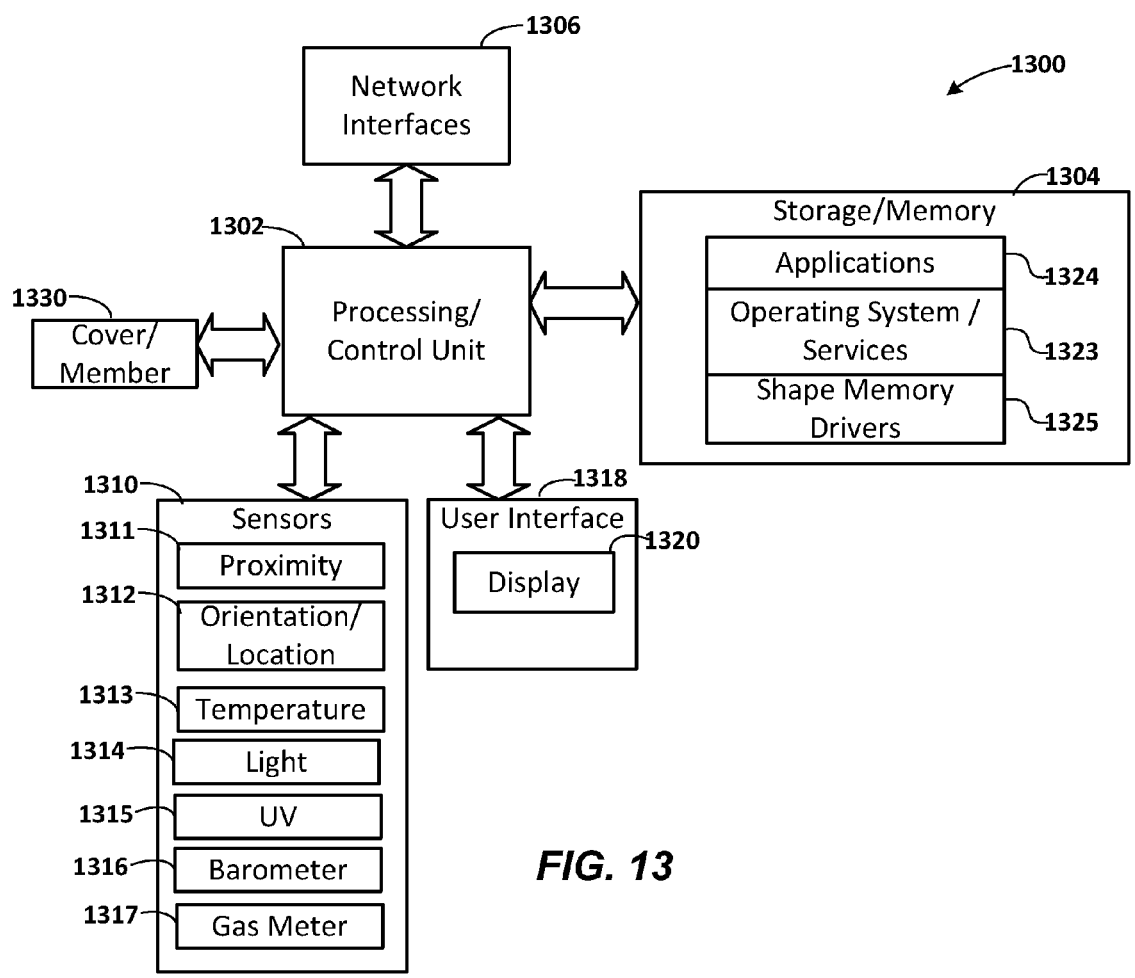
FIG. 13 is a block diagram of an apparatus according to an example embodiment.

In reference now to FIG. 13, a block diagram illustrates an apparatus that includes a cover according to an example embodiment. The user apparatus 1300 of FIG. 13 is a representative example of a mobile device, although it will be understood that similar features may be implemented in a variety of mobile and non-mobile devices. The apparatus 1300 may include, for example, a mobile apparatus, mobile phone, mobile communication device, mobile computer, laptop computer, desktop computer, server, phone device, video phone, conference phone, television apparatus, digital video recorder (DVR), set-top box (STB), radio apparatus, audio/video player, game device, positioning device, digital camera/camcorder, and/or the like, or any combination thereof. As described in greater detail below, the user apparatus 1300 may further include sensing capabilities that facilitate automating some tasks.

The processing unit 1302 controls the basic functions of the apparatus 1300. Those functions may be configured as instructions (e.g., software, firmware) stored in a program storage/memory 1304. The instructions may be provided via computer program product, computer-readable medium, and/or be transmitted to the mobile apparatus 1300 via data signals (e.g., downloaded electronically via one or more networks, such as the Internet and intermediate wireless networks). In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer The mobile apparatus 1300 may include hardware and software components coupled to the processing/control unit 1302. The mobile apparatus 1300 includes one or more network interfaces 1306 for maintaining any combination of wired or wireless data connections. These network interfaces 1306 enable the apparatus 1300 to directly communicate with other devices, and/or join in one or more communication networks.

The processor 1302 is also coupled to user-interface hardware 1318 associated with the apparatus. The user-interface 1318 may include a display 1320, such as a light-emitting diode (LED) and/or liquid crystal display (LCD) device. The user-interface hardware 1318 also may include an input device capable of receiving user inputs. This may be integrated with the display 1320 (e.g., touchscreen) and/or include dedicated hardware switches. The user-interface hardware 1318 is protected with one or more SMA covers 1330 as discussed above. These and other user-interface components are coupled to the processor 1302 as is known in the art.

The mobile apparatus 1300 also includes sensors 1310 coupled to the processing/control unit 1302. These sensors 1310 may include a capacitive proximity sensor 1311, an orientation/location sensor 1312, a temperature sensor 1313, a light sensor 1314, and an ultraviolet (UV) sensor 1315. Further sensing options may include a barometer 1316, gas meters 1317, and a variety of others. The sensors 1310 are used to determine/establish context for the mobile apparatus 1300. The sensors 1310 can be used to determine whether the mobile apparatus 1300 is in use outdoors or indoors to engage or disengage a cover 1330. For example, detection of water or humidity outdoors could cause mobile apparatus 1300 to engage cover 1330 by initiating a closed shape. These and other sensing devices are coupled to the processor 1302 as is known in the art.

The program storage/memory 1304 includes operating systems 1323 for carrying out functions and applications associated with functions on the mobile apparatus 1300. The program storage 1304 may include one or more of read-only memory (ROM), flash ROM, programmable and/or erasable ROM, random access memory (RAM), subscriber interface module (SIM), wireless interface module (WIM), smart card, hard drive, computer program product, and removable memory device. The storage/memory 1304 may also include interface modules such as operating system drivers, middleware, hardware abstraction layers, protocol stacks, and other software that facilitates accessing hardware such as user interface 1318, sensors 1310, and network interfaces 1306.

The storage/memory 1304 of the mobile apparatus 1300 may also include specialized software modules for performing functions according to example embodiments discussed above. For example, the program storage/memory 1304 includes applications 1324 that can trigger a shape transition of cover 1330. Also, shape memory drivers 1325 control cover 1330 shape transitions by applying heat or current and monitoring the status of the shape transition. The circuitry associated with SMA cover 1330 is further discussed below.

Figure 14:
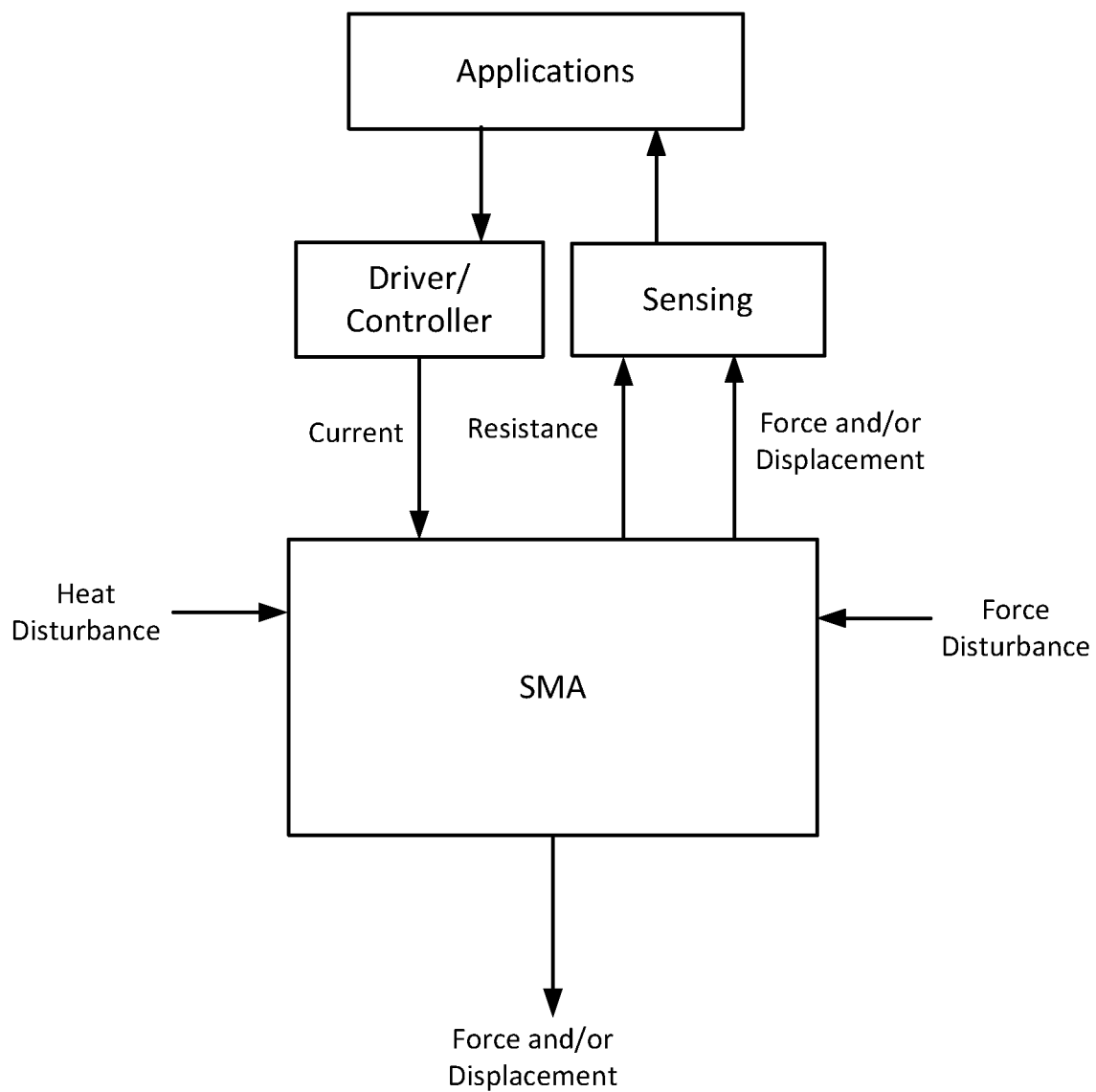
FIG. 14 is a block diagram illustrating control circuitry for a shape-memory alloy element according to an example embodiment.

With reference to FIG. 14, the controlling forces and circuitry for an SMA cover or element are described. An SMA element can transition shape in response to applied heat, current, and force. In response to these applications exceeding a material-specific threshold, the SMA element experiences a displacement or internal forces to transition to another shape. The transition is controlled via circuitry when the SMA element is utilized in an electronic device. For example, the applied current is controlled by a circuit such as a driver/controller.

The applied energy heats the SMA rendering a shape transition. The driver/controller is further controlled by applications operating in the electronic device. For example, initiation of an application such as a music player, triggers the driver/controller to apply energy to an SMA speaker cover to open the cover and expose the speaker for use with the music player. A variety of applications may be used to determine or detect a use context for the electronic device where the context controls the resultant shape of an SMA element.

The applications may also employ a feedback system to maintain control of the shape of the SMA element. For example, sensing circuitry detects resistance or displacement of an SMA element. Applications use this data to determine whether the SMA element should transition shape again such that the controller ceases applying current to the SMA element, or whether the current shape should be maintained such that current continues to be applied. Examples of these determinations are illustrated in the flow charts of FIGS. 15 and 16.

Figure 15:
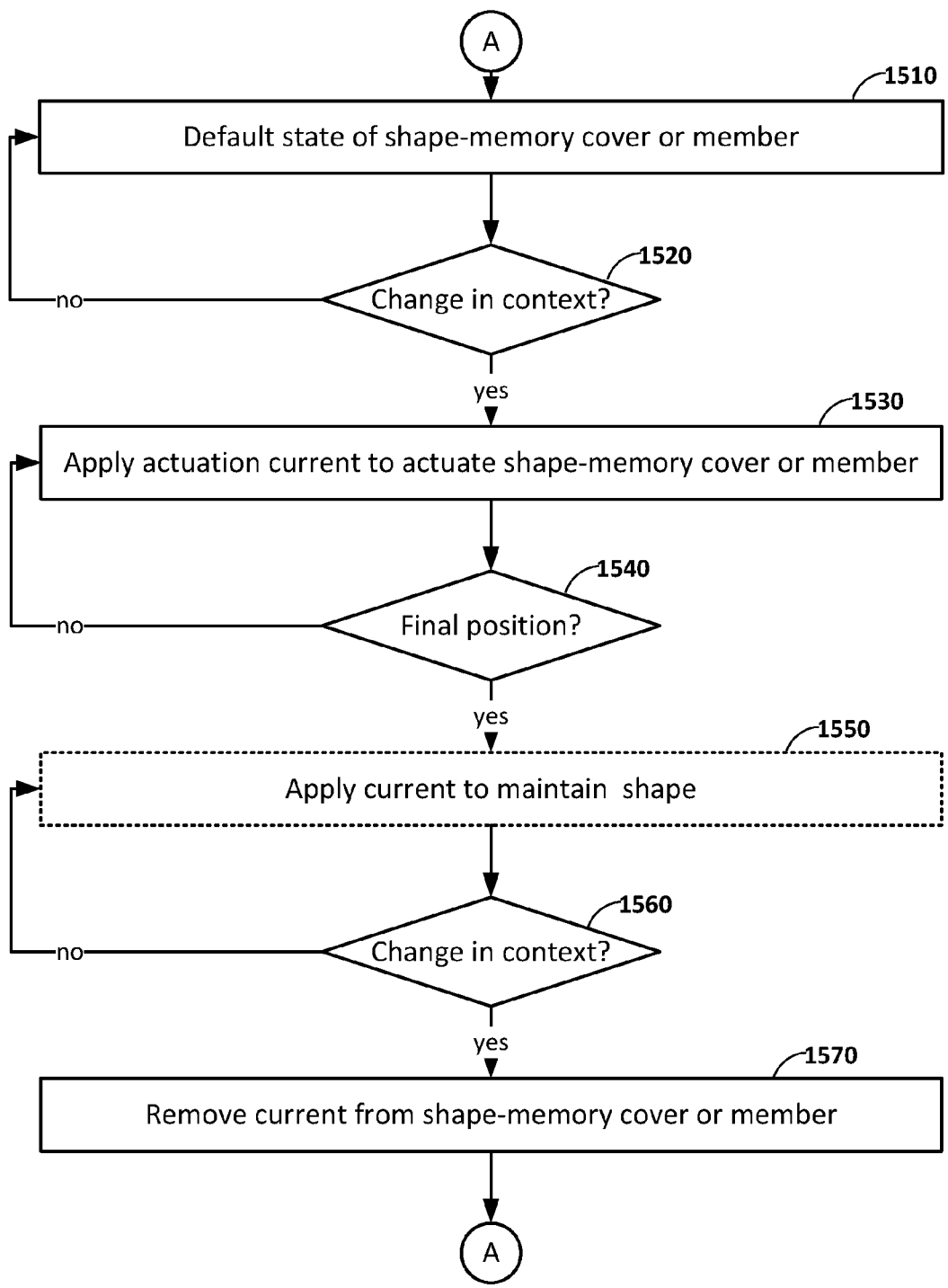
FIGS. 15 and 16 are flowcharts of methods according to example embodiments.

FIG. 15 describes a process for transitioning the shape of a SMA element based on the context of a device employing the SMA element. The SMA element is initially formed in a default shape 1510. For example, where the SMA element is a cover, the default state may be a closed shape. The device then determines whether there is/has been a change in context for the device 1520. Context recognition may be determined in a number of ways. For example, the start or use of an application in the device may identify a context. Also, heat sensed from a user's touch/handling of the device can register a context. Further context recognition methods can involve the activation/use of maps, recognition of indoor or outdoor use of the device, light level sensing, UV sensing, sensing barometric pressure, and other physical/environmental sensors such as gas meters. If there has been no change in context, the SMA element remains in the default shape.

However, if there has been a change in context for the device, actuation current is applied to actuate a shape transition of the SMA element 1530. The transition of the SMA element may be monitored to determine whether the transition is complete 1540. This monitoring is accomplished with feedback sensing circuitry. If the SMA element has not attained the final shape, further actuation current is applied. If the SMA element has attained the final shape, the transition is complete. Current is then applied to maintain the transitioned shape 1550. The amount of current applied to maintain a final shape may be less than the amount of current necessary to actuate the transition. After the final shape is attained, the device determines whether there is/has been a change in context for the device 1560. If there has been no change in context, the SMA element remains in the final shape and current is continually applied to maintain the final shape. However, if there has been a change in context for the device, current is removed from the SMA element 1570. The removal of current causes the SMA element to return to the initial, default shape.

Figure 16:
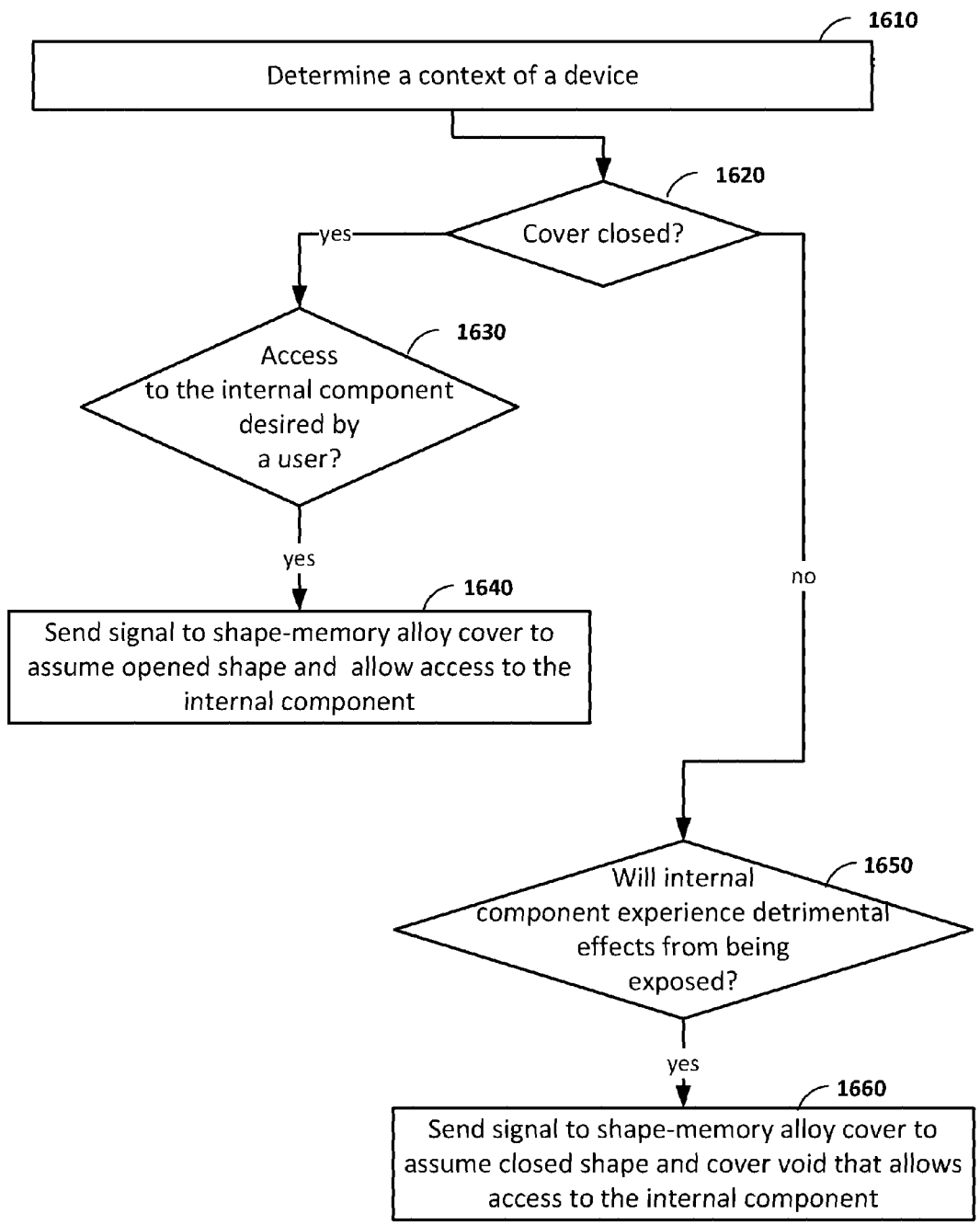

FIG. 16 illustrates a method for transitioning the shape of an SMA cover based on the context of a device employing the SMA cover. The device determines a context for the device 1610. The context may involve, for example, an application in use by the device, the physical environment in which the device is located, or the user manipulating the device. The device determines whether the SMA cover is closed 1620. If the SMA cover is closed, the device determines whether access to the internal component protected by the SMA cover is required 1630. If access is not required, the SMA cover remains closed.

However, if access is required, a signal is sent to the SMA cover to transition the SMA cover to an opened shape thereby allowing access to the protected internal component 1640. If the SMA cover is determined not to be closed, it is determined whether the protected internal component will be detrimentally affected by the resulting exposure 1650. This determination may involve environmental sensors evaluating the temperature or humidity in proximity of the device. If the internal component is not likely to experience detrimental effects from exposure, the SMA cover can remain in the open shape. However, if it is determined that the internal component should be protected, a signal is sent to the SMA cover to transition the SMA cover to a closed shape 1660. The closed shape of the SMA cover blocks, or seals, the void in the device housing corresponding to the internal component thereby protecting the internal component. The signal sent to the SMA cover to actuate the change in shape may derive from a controller or an application of the device. The actuation signal may also be a directly applied current, or heat applied directly or indirectly to the SMA cover.

The foregoing description of the example embodiments has been presented for the purposes of illustration and description. It is not intended to be exhaustive or to limit the embodiments to the precise form disclosed. Many modifications and variations are possible in light of the above teaching. It is intended that the scope be limited not with this detailed description, but rather determined by the claims appended hereto.

What is claimed is:

1. An apparatus comprising:
    an enclosure having at least one void that facilitates access to a component of the apparatus;
    a cover comprising a shape-memory alloy having at least an opened shape and closed shape, wherein the cover allows access to the component via the void in the opened shape and forms a seal of the void to prevent particles from passing therethrough in the closed shape, wherein the cover transitions from the closed shape to the opened shape in response to the apparatus being accessed; and
    a control circuit configured to cause the cover to transition between the opened shape and the closed shape.

2. The apparatus of claim 1, further comprising a heating element coupled to the cover and the control circuit, wherein activation and deactivation of the heating element causes the cover to transition between the opened shape and the closed shape.

3. The apparatus of claim 1, further comprising a sensor coupled to the control circuit, wherein the control circuit is configured to cause the cover to transition between the opened shape and the closed shape in response to determining, via the sensor, a context of the apparatus.

4. The apparatus of claim 1, wherein the control circuit is configured to cause the cover to transition between the opened shape and the closed shape in response to a signal from an application.

5. The apparatus of claim 1, wherein the cover transitions from the closed shape to the opened shape in response to body heat of a user.

6. The apparatus of claim 1, wherein the component comprises at least one of a microphone, a speaker, a camera, and a connector.

7. An apparatus comprising:
    an enclosure having at least one void that facilitates access to an internal component of the apparatus;
    a cover comprising a shape-memory alloy having at least an opened shape and closed shape, wherein the cover allows access to the internal component via the void in the opened shape and forms a seal of the void to prevent particles from passing therethrough in the closed shape, wherein the cover transitions from the opened shape to the closed shape in response to a sensed context of the apparatus; and
    a control circuit configured to cause the cover to transition between the opened shape and the closed shape.

8. The apparatus of claim 7, further comprising a heating element coupled to the cover and the control circuit, wherein activation and deactivation of the heating element causes the cover to transition between the opened shape and the closed shape.

9. The apparatus of claim 7, further comprising a sensor coupled to the control circuit, wherein the control circuit is configured to cause the cover to transition between the opened shape and the closed shape in response to determining the context via the sensor.

10. The apparatus of claim 7, wherein the control circuit is configured to cause the cover to transition between the opened shape and the closed shape in response to a signal from an application that determines the context.

11. The apparatus of claim 7, wherein the cover transitions from the closed shape to the opened shape in response to body heat of a user.

12. The apparatus of claim 7, wherein the internal component comprises at least one of a microphone, a speaker, a camera, and a connector.

13. A method comprising:
    determining a context of an apparatus, wherein the context determines at least one of a) whether an internal component of the apparatus may experience detrimental effects from particles entering via at least one void of an enclosure of the apparatus, the void facilitating access to the internal component; and b) whether access to the internal component via the void is requested; and in response to determining the context, causing a signal to be sent to a cover comprising a shape-memory alloy having at least an opened shape and closed shape, wherein the cover allows access to the internal component via the void in the opened shape and forms a seal of the void to prevent the particles from passing therethrough in the closed shape, wherein the cover transitions between the opened shape and the closed shape in response to the signal.

14. The method of claim 13, wherein the signal is sent to a heating element coupled to the cover, wherein activation and deactivation of the heating element causes the cover to transition between the opened shape and the closed shape.

15. The method of claim 13, further comprising a sensor coupled to a control circuit, wherein the control circuit is configured to cause the cover to transition between the opened shape and the closed shape in response to determining the context via the sensor.

16. The method of claim 13, wherein activation of an application determines the context.

17. The method of claim 14, wherein the heating element is activated by body heat of a user.

18. The method of claim 13, wherein the internal component comprises at least one of a microphone, a speaker, a camera, and a connector.

* * * * *